United States Patent
Schlesener et al.

[11] Patent Number: 6,091,601
[45] Date of Patent: Jul. 18, 2000

[54] SLIDE SNAP-IN FLEX CABLE BOBBIN ASSEMBLY FOR A PORTABLE COMPUTER

[75] Inventors: Maria Carmen Schlesener, Pflugerville; Rick Rogers, Belton, both of Tex.

[73] Assignee: Dell USA, L.P., Round Rock, Tex.

[21] Appl. No.: 09/037,224

[22] Filed: Mar. 10, 1998

[51] Int. Cl.[7] ................................................ H05K 5/00
[52] U.S. Cl. .......................... 361/681; 361/680; 361/683; 361/686
[58] Field of Search ............................. 361/681, 680, 361/683, 684, 685, 686

[56] References Cited

U.S. PATENT DOCUMENTS

| 3,967,661 | 7/1976 | Scoville et al. | 140/124 |
|---|---|---|---|
| 4,986,763 | 1/1991 | Boyle | 439/165 |
| 5,237,488 | 8/1993 | Moser et al. | 361/729 |
| 5,253,142 | 10/1993 | Weng | 361/680 |
| 5,335,141 | 8/1994 | Hosoi | 361/680 |
| 5,394,297 | 2/1995 | Toedter | 361/683 |
| 5,410,447 | 4/1995 | Miyagawa et al. | 361/681 |
| 5,581,440 | 12/1996 | Toedter | 361/683 |
| 5,978,210 | 11/1999 | McCrary | 361/680 |

*Primary Examiner*—Leo P. Picard
*Assistant Examiner*—Hung Van Duong
*Attorney, Agent, or Firm*—Haynes & Boone, L.L.P.

[57] ABSTRACT

A slide snap-in bobbin for a flex cable assembly on a portable computer is described. In one embodiment, the slide snap-in bobbin includes a tubular portion in which the flex cable is housed and a C-shaped portion connected to the tubular portion via a fin that holds the C-shaped portion past one end of the tubular portion. An elongated slot in the tubular portion is provided for permitting one end of the flex cable to be passed out of the tubular portion for connection to an LCD. The C-shaped portion includes a small, e.g., 1 millimeter, opening having arcuate lead-in features disposed on either side thereof for entry access to a mounting screw boss disposed on the display housing. The opening enables the bobbin to deflect the width of the boss until the opening is wide enough to accommodate the entire diameter of the boss, at which point the bobbin is snapped onto the boss and the C-shaped portion returns to its normal state. To remove the bobbin, the boss is snapped out of the C-shaped portion by urging the bobbin away from the boss such that the boss passes through the opening.

14 Claims, 4 Drawing Sheets

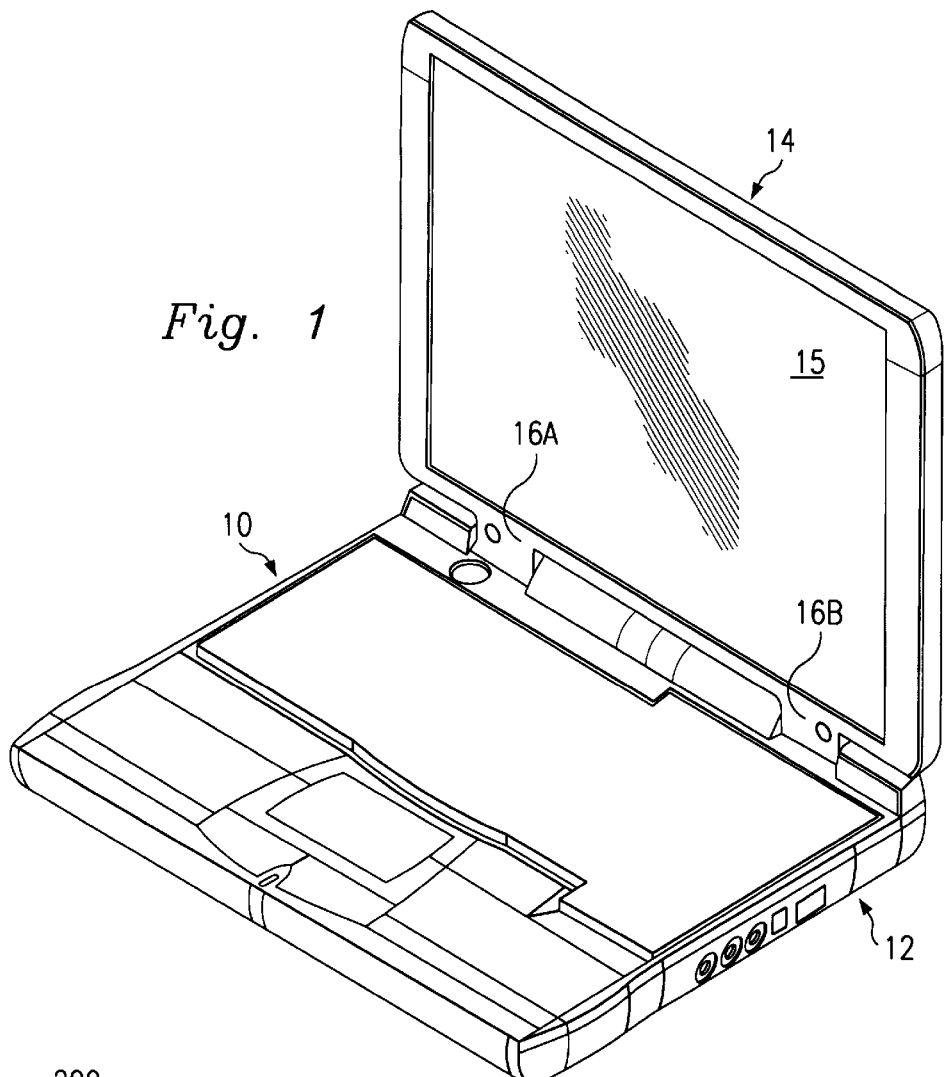
Fig. 1
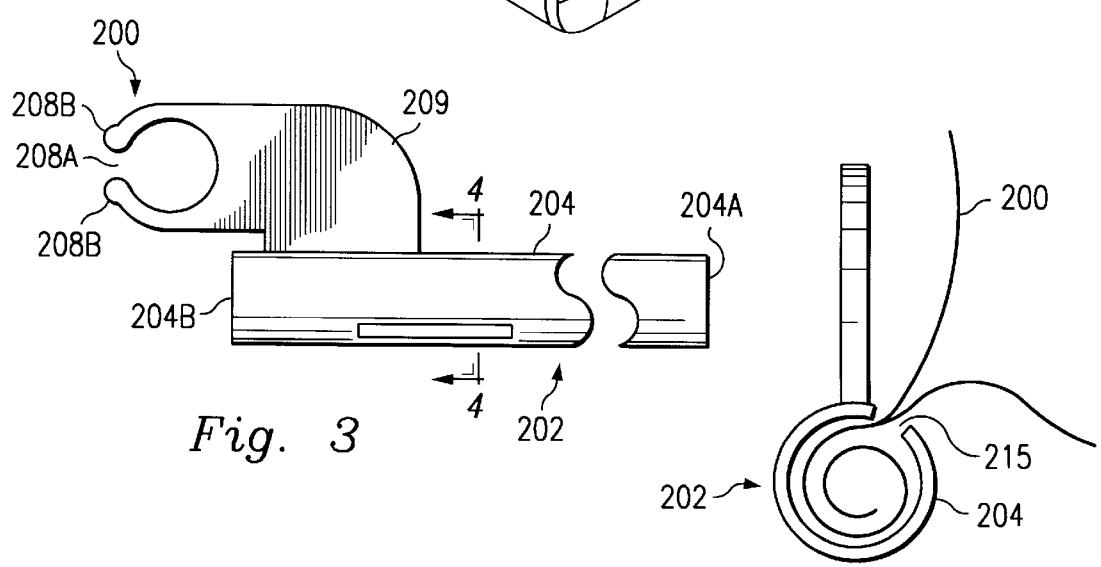
Fig. 3
Fig. 4

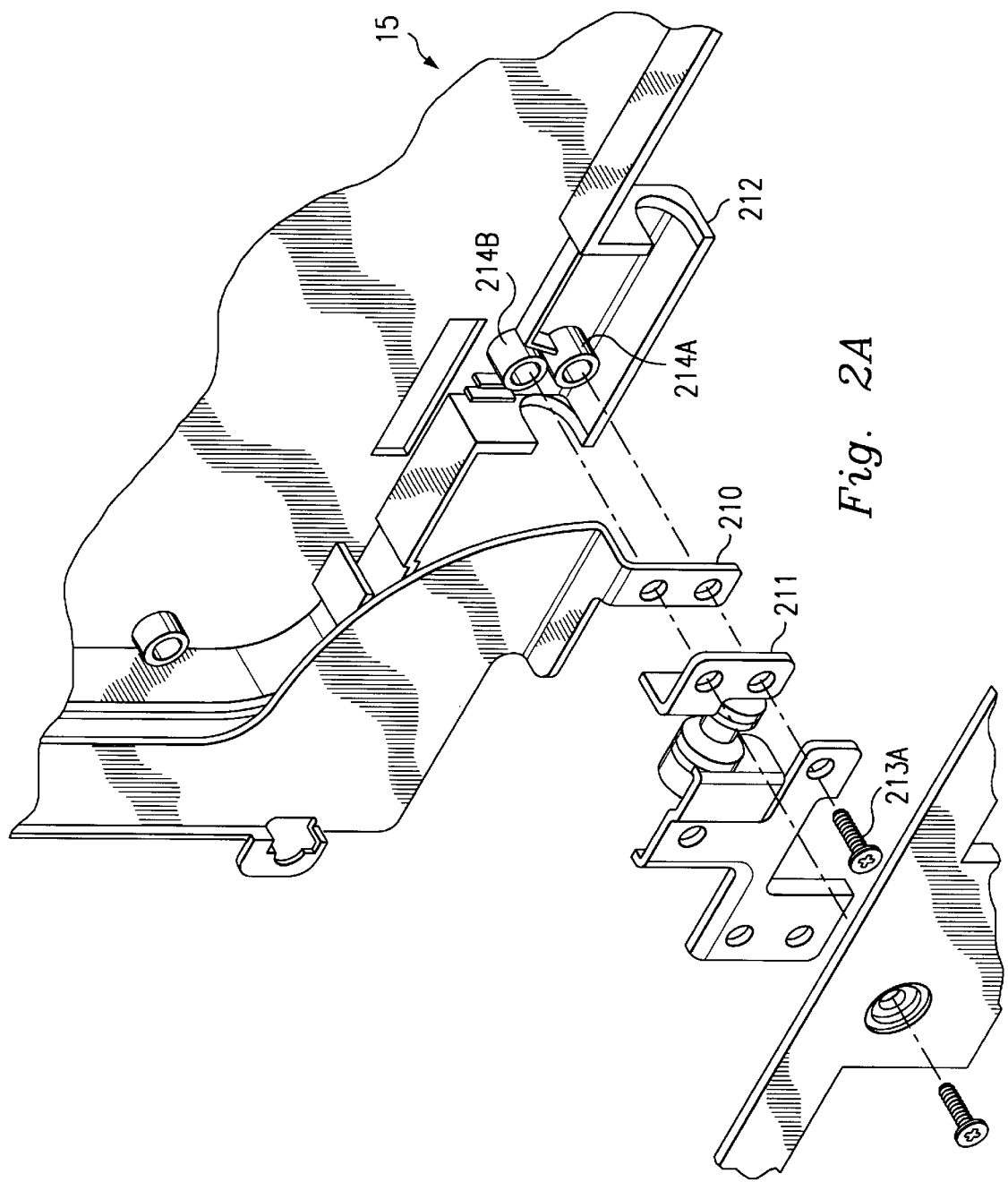

SLIDE SNAP-IN FLEX CABLE BOBBIN ASSEMBLY FOR A PORTABLE COMPUTER

TECHNICAL FIELD

One embodiment relates generally to portable computers and, more particularly, to a slide snap-in flex cable bobbin assembly for a portable computer.

BACKGROUND

In a portable computer, a plastic tube referred to as a "bobbin" is often used to hold the LCD flex cable, which is used to connect circuitry within the base of the computer to appropriate driving inputs of the LCD, in position and prevent the flex cable from breakage due to the wear inflicted on the cable as a result of constant opening and closing of the computer. The flex cable bobbin assembly is typically positioned inside the left bottom mounting screw boss for the left hinge bracket and left hinge assembly. As a result, the flex cable bobbin assembly must be placed onto the boss before the left hinge bracket and left hinge assembly can be assembled into the display housing.

In addition, the flex cable is tied down to the display housing by the aforementioned parts, which makes the construction of the display assembly difficult for assembly line workers, who have to maneuver the flex cable to connect it to the inverter board, then connect the LCD panel cable to inverter board, the inverter board to the housing, and, finally, the LCD panel to the flex cable. Redesign for the assembly is not feasible, as there is no additional space.

In some portable computer products, the LCD hinge assemblies have to be assembled with a fixture to keep the display assembly in alignment with the base assembly. When a technician needs to repair the flex cable, the hinges must be removed, thereby risking subsequent misalignment of the display and base assemblies with respect to one another. Misalignment of the system can cause the latching mechanism to function improperly, resulting in such problems as the system opening when latched or not latching at all.

Therefore, what is needed is a mechanism for attaching the flex cable bobbin assembly within a portable computer in a manner that does not require the display hinge assemblies to be removed to insert and remove the flex cable bobbin assembly.

SUMMARY

One embodiment, accordingly, provides a slide snap-in flex cable bobbin assembly for a flex cable assembly on a portable computer. In one embodiment, the slide snap-in flex cable bobbin assembly includes a tubular portion in which the flex cable is housed and a C-shaped portion connected to the tubular portion via a fin that holds the C-shaped portion past one end of the tubular portion. An elongated slot in the tubular portion is provided for permitting one end of the flex cable to be passed out of the tubular portion for connection to an LCD. The C-shaped portion includes a small, e.g., 1 millimeter, opening having arcuate lead-in features disposed on either side thereof for entry access to a hinge fixture mounting screw boss. The opening enables the bobbin to deflect the width of the boss until the opening is wide enough to accommodate the entire diameter of the boss, at which point the flex cable bobbin assembly is snapped onto the boss and the C-shaped portion returns to its normal state.

To install the bobbin assembly, one simply slides the snaps the boss into the C-shaped portion of the bobbin, as described above, pressing slowly against the boss until the bobbin can travel no further, indicating that the bobbin assembly is seated in position. The boss is snapped out of the C-shaped portion by urging the bobbin away from the boss such that the boss passes back through the opening.

A technical advantage achieved is that the display hinge assemblies need not be removed to remove and replace the flex cable bobbin assembly.

BRIEF DESCRIPTION OF THE DRAWINGS

FIG. 1 is a view of a portable computer embodying features of a preferred embodiment.

FIGS. 2A–2C are exploded views of the left display hinge assembly of the portable computer of FIG. 1.

FIG. 3 is a perspective view of a bobbin of the left display hinge assembly of FIGS. 2A–2C.

FIG. 4 is a cutaway view of the bobbin of FIG. 3 along a line 4—4.

DESCRIPTION OF THE PREFERRED EMBODIMENT

FIG. 1 is a perspective view of a portable computer 10 embodying features of a preferred embodiment. As shown in FIG. 1, the portable computer 10 includes a base assembly 12, in which various devices and subsystems of the computer 10 are housed, and a display assembly 14, which houses, among other things, an LCD 15. The display assembly 14 is connected to the base assembly 12 via hinge assemblies 16 on either side of the display assembly 14.

Figure 2B:
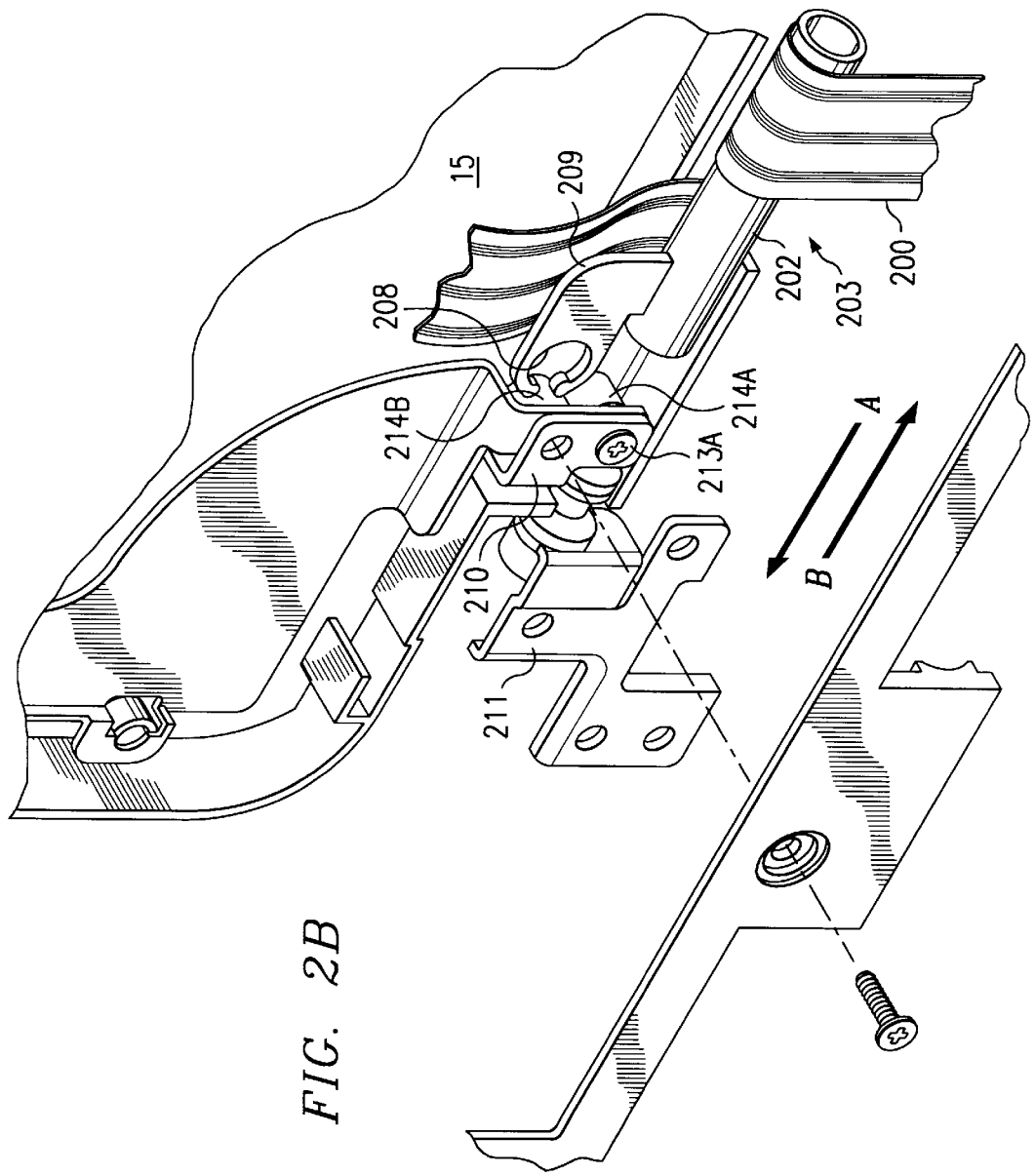
Figure 2C:
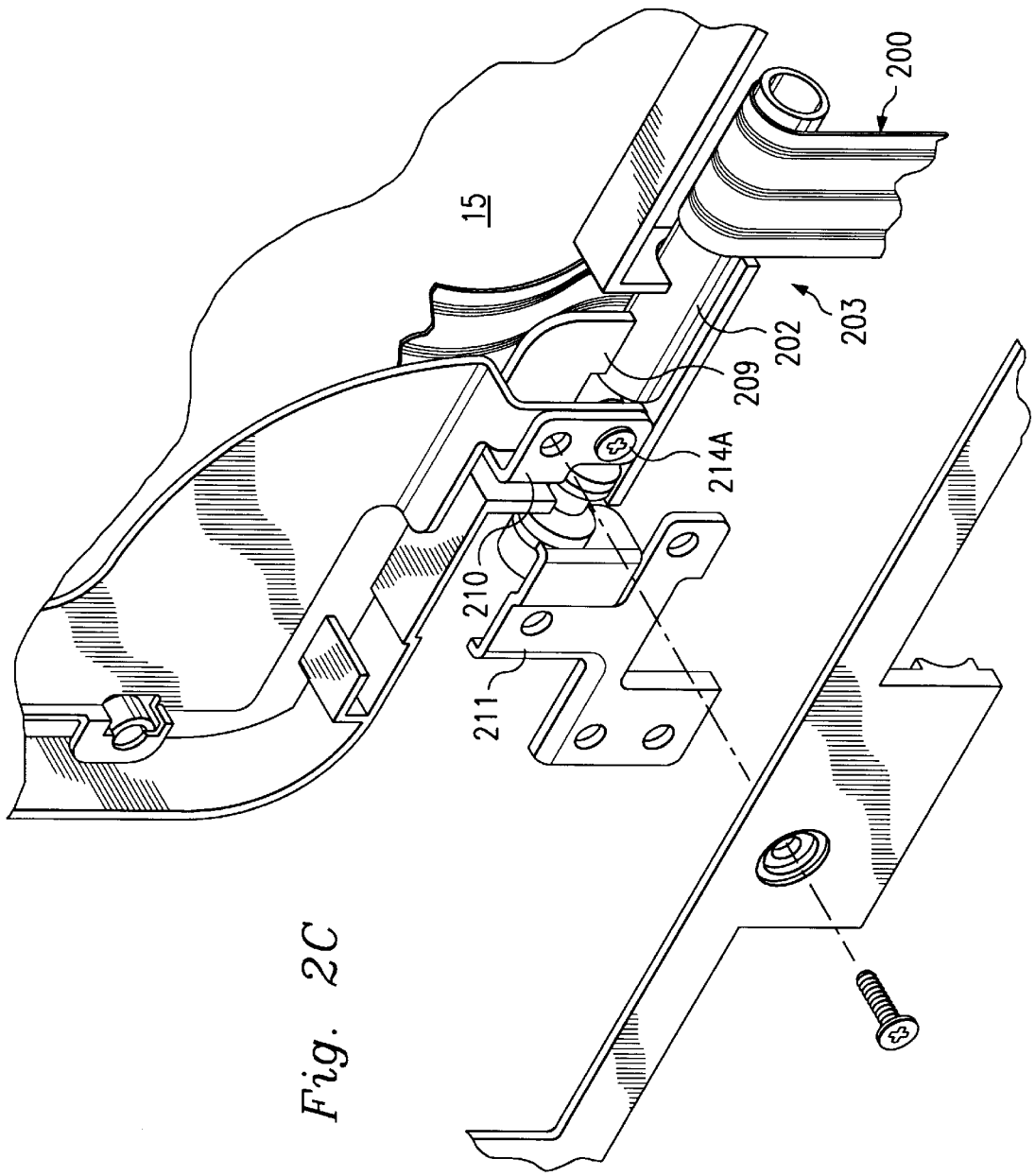

Referring now to FIGS. 2A–2C, an LCD flex cable 200 for connecting circuitry within the base assembly 12 of the computer 10 to appropriate drive inputs (not shown) of the LCD 15 is enclosed within a slide snap-in bobbin 202 for retaining the flex cable in place and for preventing breakage due to stress and wear on the flex cable. The bobbin 202 and the flex cable 200 together make up a flex cable bobbin assembly 203.

The bobbin 202 includes a tubular portion 204 having a first end 204b and a second end 204a and in which the flex cable 200 is housed and a C-shaped portion 208 connected to the tubular portion 204 via a fin 209 that holds the C-shaped portion past the first end 204b of the tubular portion 204. An elongated slot 215, best shown in FIG. 4, in the tubular portion 204 is provided for permitting one end of the flex cable 200 to be passed out of the tubular portion 204 for connection to the back of the LCD 15. As best shown in FIG. 3, the C-shaped portion 208 includes a small, e.g., 1 millimeter, opening 208a having arcuate lead-in features 208b disposed on either side thereof In the preferred embodiment, as best illustrated in FIGS. 2A–2C, during assembly of the computer 10, a hinge bracket 210 and then a hinge assembly 211 are mounted to an LCD housing 212 with a first mounting screw 213a received in a first mounting screw boss 214a disposed on the LCD housing 212. At that point, the flex cable bobbin assembly 203 is mounted to a second mounting screw boss 214b disposed on the LCD housing 212 by placing the opening 208a of the C-shaped portion 208 against the boss 214b and then pressing the C-shaped portion against the boss in a direction indicated by an arrow A. The lead-in features 208b are designed to deflect to the width of the boss 214b until the opening 208a is wide enough to permit the entire diameter of the boss 214b to pass therethrough, at which point the bobbin assembly 203 snaps into place and the C-shaped portion 208 returns to its regular configuration. In a similar manner, to remove the bobbin assembly 203, the mounting screw 213a need not be unscrewed, thereby disassembling the hinge assembly 16. Rather, the bobbin assembly 203 is urged in a direction indicated by an arrow B until the boss 214b is released from the C-shaped portion 208 through the opening 208a.

In this manner, hinge assembly 16b, and hence the alignment of the display assembly 14 with respect to the base assembly 12 remains undisturbed while the bobbin assembly 203 is removed and replaced.

Although an illustrative embodiment has been shown and described, other modifications, changes, and substitutions are intended in the foregoing disclosure. Accordingly, it is appropriate that the appended claims be construed broadly and in a manner consistent with the scope of the disclosure.

What is claimed is:

1. A bobbin for housing a cable, the bobbin comprising:
    a hollow tube having first and second ends and a longitudinal slot therein, said slot extending between said first and second ends; and
    a C-shaped portion connected to said hollow tube via a fin-shaped member;
    wherein said C-shaped portion comprises two arcuate lead-in features defining an opening therebetween for receiving and retaining therewithin a boss.

2. The bobbin of claim 1 wherein said C-shaped portion extends past said first end of said hollow tube.

3. The bobbin of claim 1 wherein said boss is a mounting screw boss disposed on an LCD housing of a portable computer.

4. The bobbin of claim 1 wherein said cable is an LCD flex cable.

5. A bobbin comprising:
    means for housing a cable, said housing means having a longitudinal slot therein; and
    means connected to said housing means for retaining a boss, said means for retaining a boss having an opening for receiving said boss therethrough;
    wherein said means for retaining a boss comprises two arcuate lead-in features defining an opening therebetween for receiving and retaining therewithin a boss.

6. The bobbin of claim 5 wherein said boss is a mounting screw boss disposed on an LCD housing of a portable computer.

7. The bobbin of claim 5 wherein said cable is an LCD flex cable.

8. A flex cable bobbin assembly for a portable computer comprising:
    a hollow tube having first and second ends and a longitudinal slot therein, said slot extending between said first and second ends;
    a flex cable disposed within said hollow tube and having at least one end extending out of said hollow tube through said longitudinal slot; and
    a C-shaped portion connected to said hollow tube via a fin-shaped member;
    wherein said C-shaped portion comprises two arcuate lead-in features defining an opening therebetween for receiving and retaining therewithin a boss.

9. The bobbin assembly of claim 8 wherein said C-shaped portion extends past said first end of said hollow tube.

10. The bobbin assembly of claim 8 wherein said boss is a mounting screw boss disposed on an LCD housing of said portable computer.

11. A portable computer comprising:
    a base assembly;
    a display assembly including a display housing having a mounting screw boss for receiving a mounting screw;
    at least one hinge assembly for rotatable connecting said display assembly to said base assembly;
    a bobbin for housing an LCD flex cable said bobbin comprising:
        a hollow tube having first and second ends and a longitudinal slot therein; and
        C-shaped portion connected to said hollow tube via a fin-shaped member for receiving and retaining therewithin said mounting screw boss, thereby connecting said bobbin to said hinge assembly;
    wherein said C-shaped portion of said bobbin comprises two arcuate lead-in features defining an opening therebetween for receiving and retaining therewithin a boss.

12. The portable computer of claim 11 wherein said C-shaped portion of said bobbin extends past said first end of said hollow tube.

13. A method of assembling a portable computer comprising a base assembly, a display assembly including a display housing, and at least one hinge assembly for rotatable connecting said display assembly to said base assembly, the method comprising:
    securing a hinge bracket and said hinge assembly to said display housing using a mounting screw;
    subsequent to said securing said hinge bracket and said hinge assembly, securing an LCD flex cable bobbin assembly to a mounting screw boss disposed on said display housing for receiving a mounting screw, said LCD flex cable bobbin assembly including a slot through which an end of an LCD flex cable extends; and
    securing said end of said LCD flex cable within said display assembly;
    wherein said C-shaped portion of said LCD flex cable bobbin assembly comprises two arcuate lead-in features defining an opening therebetween for receiving and retaining therewithin said mounting screw boss.

14. The method of claim 13 wherein said LCD flex cable bobbin assembly comprises a C-shaped portion, said securing said LCD flex cable bobbin assembly further comprising pressing an opening of said C-shaped portion against said mounting screw boss until said opening expands sufficiently to admit said mounting screw boss therethrough, wherein subsequent to admission of said mounting screw boss, said opening returns to its original size, thereby retaining said mounting screw boss within an aperture defined by said C-shaped portion.

* * * * *